United States Patent Office 3,316,261
Patented Apr. 25, 1967

3,316,261
PROCESS FOR MAKING A 2-AMINOKETONE
George P. Speranza and Stanley B. Cavitt, Austin, Tex., assignors to Jefferson Chemical Company, Inc., Houston, Tex., a corporation of Delaware
No Drawing. Filed Oct. 28, 1963, Ser. No. 319,563
7 Claims. (Cl. 260—247.7)

This invention relates to aminoketones. More particularly, this invention relates to an improved method for the production of 2-aminoketones.

It has been discovered that 2-aminoketones can be prepared from secondary amines and certain hydroxymethylketones as schematically illustrated by the following equation:

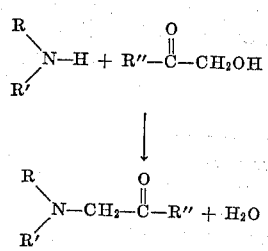

wherein R is selected from the group consisting of alkyl and cycloalkyl groups containing from 1 to 18 carbon atoms, R' may be an alkyl, cycloalkyl, phenyl, phenalkyl, or alkylphenyl group containing from 1 to 18 carbon atoms, or R and R' taken together may represent a cyclizing group containing from 3 to 18 carbon atoms and may be carbocyclic or heterocyclic in nature, and wherein R'' is selected from the group consisting of alkyl, cycloalkly, phenyl, alkyl-phenyl and phenalkyl groups containing from 1 to 18 carbon atoms.

Examples of suitable secondary amines that may be utilized in accordance with the present invention include aliphatic and aliphatic-aromatic secondary amines such as dipropylamine, dibutylamine, di-n-decylamine, di-n-octyldecylamine, N-methylaniline, N-ethylaniline, N-octylaniline, oxazolidine, pyrroline, oxazines such as morpholines, pyrroles, indoles, piperazines, N-alkyl-piperazines, piperidines, etc.

Suitable 1,2-hydroxyketones to be employed in accordance with the present invention are those containing an alpha hydroxymethyl group such as hydroxyacetone, also known as acetol, hydroxymethyl ethyl ketone, hydroxymethyl propyl ketone, hydroxymethyl phenyl ketone, hydroxymethyl butyl ketone, hydroxymethyl octadecyl ketone, hydroxymethyl benzyl ketone, hydroxymethyl cyclohexyl ketone, etc.

The reaction proceeds non-catalytically and is suitably conducted at a temperature within the range of from about 50° to 250° C. and may be conducted at atmospheric, superatmospheric or subatmospheric pressures. Contact time may suitably be within the range of about 0.1 to 10 hours.

The reaction is preferably conducted in an organic solvent solution with appropriate non-reactive organic solvents such as aromatic hydrocarbons, chlorinated hydrocarbons, ethers, aliphatic hydrocarbon solvents, etc. Examples of soluble solvents include benzene, toluene, butanol, dioxane, methylene dichloride, etc.

The invention will be further illustrated by the following specific examples which are given by way of illustration and not as limitations on the scope of this invention.

*Example I.—Morpholinoacetone*

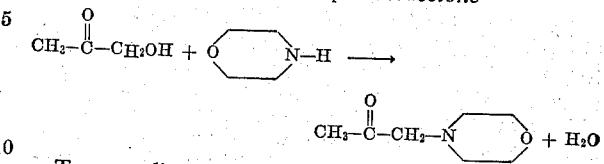

To a one-liter, three-necked flask equipped with a stirrer, thermometer, Dean-Starke trap and condenser was added 402 g. (4.6 mols) of morpholine, 296 g. (4.0 mols) of hydroxyacetone and 100 g. of benzene. The reaction mixture was heated to boiling and after four hours there was obtained 92 ml. of water. The benzene was removed to a pot temperature of 170° C. and the remainder distilled. There was obtained 369 g. (65% yield) of morpholinoacetone; equivalent wt. 143. The product was identified by its infrared spectra, molar refraction and the fact that it could be hydrogenated to 2-hydroxypropylmorpholine. It also gave a positive haloform test. When freshly distilled, morpholinoacetone is a colorless liquid that slowly turns yellow on standing. The properties of this product and others prepared in this work are given in Table 1.

*Example II.—N-methylpiperazinoacetone*

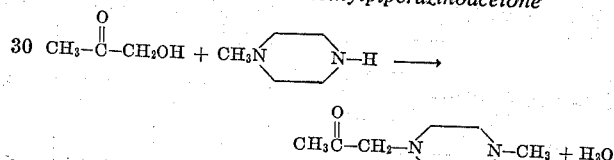

To a one-liter, three-necked flask equipped with a dropping funnel, stirrer, water trap, condenser and thermometer was added a mixture of 148 g. (2 mols) of hydroxyacetone and 100 ml. of benzene. The mixture was heated to reflux and 180 g. of N-methylpiperazine (1.8 mols) added at such a rate so as to maintain vigorous reflux. Addition was complete after 30 minutes. The reaction was allowed to proceed for 1.75 hours, during which 44 ml. of aqueous layer was obtained. After removal of the benzene by heating the reaction mixture to 60° C. under water aspirator vacuum, the residue was distilled to give 231 g. of product (85% yield). The product turned slightly yellow on exposure to air.

*Example III.—Morpholinomethyl ethyl ketone*

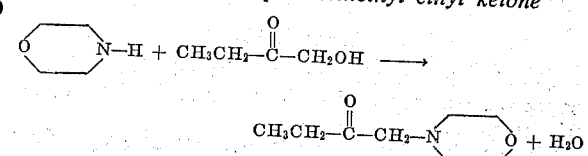

To a 500 ml., three-necked flask equipped as above was added 96.8 g. of 1-hydroxy-2-butanone (1.1 mols) and 100 ml. of benzene. Morpholine (86 g., 1.0 mol) was added. The temperature rose to 33° C. After 2.5 hours at reflux, 18 ml. of water was collected. Distillation gave about 119 g. of product (equivalent weight 159), which represented a yield of 75%.

*Example IV.—N-methylanilinoacetone*

To a liter flask equipped as above was added, in order, 148 g. (2 mols) of hydroxyacetone, 200 ml. benzene and 214 g. (2 mols) N-methylaniline containing 1 g. of American Cyanamid's 2246 antioxidant. The mixture was heated at vigorous reflux for 5.25 hours. There was obtained 42 ml. of a water layer. Distillation gave 106 g. (32% yield) of N-methylanilinoacetone (I) and 65 g. of 1,2-bis(N-methylanilino)-1-propene (II). Product (I) was a light-yellow, oily liquid while (II) after 2 recrystallizations from methanol melted at 85° to 87° C. The white prismatic crystals were analyzed for nitrogen: calculated for $C_{17}H_{20}N_2$: N, 11.1%; found: N, 11.0%.

*Example V.—Diisobutylaminoacetone*

To 148 g. of hydroxyacetone (2 mols) and 200 ml. of benzene was added over a two-hour period 232 g. of diisobutylamine (1.8 mols) while maintaining reflux. The mixture turned dark green initially and later became reddish orange. The reaction mixture was refluxed for an additional 3.5 hours during which an equeous layer amounting to 36 ml. was collected. The solution was concentrated by removing solvent on a steam bath at 50° C. under aspirator reduced pressure. There was obtained on distillation of the residue 143 g. of diisobutylaminoacetone (43% yield) and 54 g. of a compound presumed to be 1,2 - bis(diisobutylamino) - 1 - propene. The equivalent weight of the title product was 186 (theory 185).

The products obtained and their properties are set forth in the following table:

with a keto alcohol of the formula:

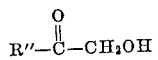

and recovering the 2-aminoketone; wherein R has 1 to 18 carbon atoms and is selected from a group consisting of alkyl and cycloalkyl groups, R' has 1 to 18 carbon atoms and is selected from the group consisting of alkyl, cycloalkyl, aryl, aralkyl, and alkylphenyl groups, R'' has 1 to 18 carbon atoms and is selected from a group consisting of alkyl, cycloalkyl, phenyl, alkylphenyl and phenalkyl groups, and R and R' taken together have 3 to 18 carbon atoms and is selected from a class consisting of carbocyclic and heterocyclic cyclizing groups.

2. A method as in claim 1 wherein said ketoalcohol is hydroxyacetone.

3. A method for preparing morpholinoacetone which comprises the steps of reacting morpholine with hydroxyacetone in a solvent solution at a temperature within the range of 50° to 250° C. to provide thereby said morpholinoacetone and recovering said morpholinoacetone.

4. A method for preparing N-methylpiperazinoacetone which comprises the steps of reacting N-methylpiperazine with hydroxyacetone in a solvent solution at a tempera-

TABLE 1.—PROPERTIES OF AMINOKETONES

| Compound | Boiling Point (° C./mm.) | Density ($d_4^{25}$) | Refractive Index ($n_D^{25}$) | Molar Refraction | |
|---|---|---|---|---|---|
| | | | | Calculated | Observed |
| $CH_3-\overset{O}{\overset{\|}{C}}-CH_2-N\langle\ \rangle O$ | 78/5 | [1] 1.0357 | [1] 1.4617 | 37.93 | 37.95 |
| $CH_3-CH_2-\overset{O}{\overset{\|}{C}}-CH_2-N\langle\ \rangle O$ | 74/1.5 | 1.0103 | 1.4587 | 42.55 | 42.57 |
| $CH_3-\overset{O}{\overset{\|}{C}}-CH_2-N\langle\ \rangle N-CH_3$ | 51/0.1 | 0.9589 | 1.4634 | 44.85 | 44.80 |
| $CH_3-\overset{O}{\overset{\|}{C}}-CH_2-\underset{\underset{C_6H_5}{\|}}{N}-CH_3$ | 90/0.5 | 1.0442 | 1.5543 | [2] 49.25 | 50.15 |
| $CH_3-\overset{O}{\overset{\|}{C}}-CH_2-N(CH_2CH(CH_3)_2)_2$ | 87/8 | 0.8395 | 1.4295 | 56.97 | 57.05 |

[1] At 20° C.
[2] Molar refractions of substances containing conjugated double bonds are usually one or more units in excess of calculated values.

*Example VI*

Unsatisfactory results were experienced when diphenylamine was used as a feed stock and Example V was otherwise repeated.

The α-aminoketone products that may be prepared by the process of the present invention are useful in the preparation of substituted indoles and 1,2-dihydro-1,3,5-triazines.

Having thus described our invention, what is claimed is:

1. A process for preparing a 2-aminoketone which comprises reacting at a temperature of 50° to 250° C. a secondary amine of the formula:

ture within the range of 50° to 250° C. to provide thereby said N-methylpiperazinoacetone and recovering said N-methylpiperazinoacetone.

5. A method for preparing morpholinomethyl ethyl ketone which comprises the steps of reacting morpholine with 1-hydroxy-2-butanone in a solvent solution at a temperature within the range of 50° to 250° C. to provide thereby said morpholinomethyl ethyl ketone and recovering said morpholinomethyl ethyl ketone.

6. A method for preparing N-methylanilinoacetone which comprises the steps of reacting N-methylaniline with hydroxyacetone in a solvent solution at a temperature within the range of 50° to 250° C. to provide thereby said N-methylanilinoacetone and recovering said N-methylanilinoacetone.

7. A method for preparing diisobutylaminoacetone which comprises the steps of reacting diisobutylamine with hydroxyacetone in a solvent solution at a temperature within the range of 50° to 250° C. to provide thereby said diisobutylaminoacetone and recovering said diisobutylaminoacetone.

No references cited.

ALEX MAZEL, *Primary Examiner.*

J. TOVAR, H. R. JILES, *Assistant Examiners.*